United States Patent
Fleisher

(10) Patent No.: US 11,417,096 B2
(45) Date of Patent: Aug. 16, 2022

(54) VIDEO FORMAT CLASSIFICATION AND METADATA INJECTION USING MACHINE LEARNING

(71) Applicant: Vimeo, Inc., New York, NY (US)

(72) Inventor: Or Fleisher, New York, NY (US)

(73) Assignee: Vimeo.com, Inc., New York, NY (US)

( * ) Notice: Subject to any disclaimer, the term of this patent is extended or adjusted under 35 U.S.C. 154(b) by 225 days.

(21) Appl. No.: 16/880,143

(22) Filed: May 21, 2020

(65) Prior Publication Data
US 2020/0372255 A1 Nov. 26, 2020

Related U.S. Application Data

(60) Provisional application No. 62/850,614, filed on May 21, 2019.

(51) Int. Cl.
| | |
|---|---|
| *G06V 20/40* | (2022.01) |
| *G06N 3/08* | (2006.01) |
| *G06N 3/04* | (2006.01) |
| *G06K 9/62* | (2022.01) |

(52) U.S. Cl.
CPC ........... *G06V 20/41* (2022.01); *G06K 9/6256* (2013.01); *G06N 3/04* (2013.01); *G06N 3/08* (2013.01); *G06V 20/49* (2022.01)

(58) Field of Classification Search
CPC ...... G06K 9/6256; G06K 9/6273; G06N 3/04; G06N 3/0454; G06N 3/0481; G06N 3/08; G06N 3/082; G06V 10/454; G06V 10/82; G06V 20/41; G06V 20/49
See application file for complete search history.

(56) References Cited

U.S. PATENT DOCUMENTS

| | | | | |
|---|---|---|---|---|
| 2014/0355861 | A1* | 12/2014 | Nirenberg | G06N 3/049 382/133 |
| 2018/0130355 | A1* | 5/2018 | Zia | G06V 20/64 |
| 2018/0137389 | A1* | 5/2018 | Mathieu | G06N 3/0445 |
| 2018/0165548 | A1* | 6/2018 | Wang | G06N 3/084 |
| 2019/0034709 | A1* | 1/2019 | Qiu | G06T 7/593 |
| 2019/0087661 | A1* | 3/2019 | Lee | G06V 10/25 |
| 2019/0385057 | A1* | 12/2019 | Litichever | H04L 63/14 |
| 2020/0265219 | A1* | 8/2020 | Liu | G06N 20/00 |

OTHER PUBLICATIONS

Nikolaos Zioulis, "OmniDepth: Dense Depth Estimation for Indoors Spherical Panoramas.," Jul. 25, 2018, Proceedings of the European Conference on Computer Vision (ECCV), 2018, pp. 1-14.*
Jiachen Yang, "3D Panoramic Virtual Reality Video Quality Assessment Based on 3D Convolutional Neural Networks," Jul. 11, 2018, IEEE Access (vol. 6),pp. 38669-38676.*

(Continued)

*Primary Examiner* — Omar S Ismail
(74) *Attorney, Agent, or Firm* — BakerHostetler

(57) ABSTRACT

Methods, systems, and computer program products for classifying a spatial format of a video file. The system includes one or more processors and a memory coupled to the processors. The memory stores data comprising program code that, when executed by the processors, causes the system to allow video sharing platforms to support multiple formats without asking users to manually identify the format of the video.

41 Claims, 10 Drawing Sheets

(56) References Cited

OTHER PUBLICATIONS

Hsien-Tzu Cheng,"Cube Padding forWeakly-Supervised Saliency Prediction in 360○ Videos," Jul. 8, 2016, Proceedings of the IEEE Conference on Computer Vision and Pattern Recognition (CVPR),Jun. 2018,pp. 1420-1426.*

Muzammal Naseer,"Indoor Scene Understanding in 2.5/3D for Autonomous Agents: A Survey," Dec. 12, 2018, IEEE Access (vol. 7),pp. 1859-1879.*

Haiman Tian,"Multimodal deep representation learning for video classification," May 3, 2018,World Wide Web (2019) 22:1325-1341, https://doi.org/10.1007/s11280-018-0548-3, pp. 1326-1333.*

Guo et al.; "Entity Embeddings of Categorical Variables"; Computer Science—Machine Learning; Neokami Inc.; 2016; 9 pages.

Simonyan et al.; "Very Deep Convolutional Networks for Large-Scale Image Recognition"; Computer Science—Computer Vision and Pattern Recognition; University of Oxford; 2014; 14 pages.

Wilson et al.; "The Marginal Value of Adaptive Gradient Methods in Machine Learning"; NIPS Proceedings—Advances in Neural Information Processing Systems 30; 2017; 11 pages.

Kingma et al.; "Adam: A Method for Stochastic Optimization"; Computer Science—Machine Learning; 2015; 15 pages.

Kennedy et al.; "Understanding map projections"; Environmental Systems Research Institute, Inc. ©1994-2000; 110 pages.

\* cited by examiner

Accuracy of 95.3% on validation set after 100 epochs

Cost value of 0.027% on validation set after 100 epochs

VIDEO FORMAT CLASSIFICATION AND METADATA INJECTION USING MACHINE LEARNING

CROSS REFERENCE TO RELATED APPLICATIONS

This application claims the benefit of U.S. Provisional Application No. 62/850,614, filed May 21, 2019, entitled "Video Format Classification and Metadata Injection Using Machine Learning," which is hereby incorporated by reference herein in its entirety.

BACKGROUND

Spherical video (also known as equirectangular 360 and equirectangular 360 stereo) requires special metadata, as described in Google's Spatial Media specification in order to be uploaded, transcoded and rendered correctly in rectilinear format. To achieve that, current video sharing platforms enable users to upload and manually select a special option in the interface as shown in FIG. 1 stating that this is a spherical video (equirectangular monoscopic/stereoscopic), and therefore should be transcoded and displayed accordingly.

Uploading 360 video to a video sharing platform (other some other video-based application) is currently only implemented in the desktop web experience, meaning mobile users currently cannot upload equirectangular 360 content. Furthermore, there are two additional steps, as shown in FIG. 1, needed to upload 360 content which make the upload process less intuitive.

SUMMARY

According to some embodiments of the invention, a method, system, and computer program product is provided of classifying a spatial format of a video file. By training a supervised convolutional neural network to classify the video type, embodiments of the current disclosure provide systems and methods with capabilities to detect whether a video is 2D, equirectangular 360 or equirectangular 360 stereo and to take the necessary steps to transcode and display video correctly. For example, as additional formats become supported in production (e.g., 180 video, 3D side by side), embodiments will allow video sharing platforms to support multiple formats without asking users to manually identify the format of the video, e.g., streamlining the upload experience.

An aspect of the current disclosure provides a fully-automatic system for classifying the spatial format of a video file. For example, a fully-automatic system for classifying the spatial format of a video file may include one or more of the following steps or stages: (a) a video pre-processing stage, e.g., splitting and resizing an input video file into a set of frames; (b) a convolutional neural network, e.g., receiving the set of frames and predicting one or more confidence values for each of the frames respectively, wherein the confidence values are one-hot encoded confidence values signifying either 2D, spherical (equirectangular) or stereo spherical (top-bottom equirectangular) projections detected per frame; (c) a discriminator stage, e.g., receiving the confidence values from the convolutional neural network and determining the spatial format of video based upon a mean confidence value calculated from the sum of per-frame confidence values; and (d) a tagging stage, e.g., adds the correct metadata associated with the video file corresponding to the format of the video determined at the discriminator stage.

In an embodiment, a system for classifying the spatial format of a video file includes one or more of the following stages or steps: a video pre-processing stage, e.g., splitting an input video file into a set of frames; a convolutional neural network, e.g., receiving the set of frames and predicting one or more confidence values for each of the frames respectively, wherein the confidence values signify one or more spatial video formats detected per frame; a discriminator stage, e.g., receiving the per-frame confidence values from the convolutional neural network and determining the spatial format of video based upon an overall confidence value calculated from the plurality of per-frame confidence values; and an action stage, e.g., that takes appropriate action with respect to the video file based upon the determined spatial format of the video, where the appropriate action can be meta-tagging the video file according to the determined spatial format, storing the video file according to the determined spatial format, playing the video file according to the determined spatial format, transmitting the video file according to the determined spatial format, and/or displaying the result of the determined spatial format to a user.

In another embodiment, a convolutional neural network architecture may utilize less than five convolution layers and at least one dropout layer. Alternatively, or in addition, the convolutional neural network architecture may utilize a plurality of convolution layers and at least three dropout layers. Alternatively, or in addition, the convolutional neural network architecture may utilize five convolution layers and three dropout layers. Alternatively, or in addition, the convolutional neural network architecture may utilize batch normalization on each layer. Alternatively, or in addition, the convolutional neural network architecture may utilize convolution layers to break down the frames into smaller filters that contain patterns associated with one or more distortion types. Alternatively, or in addition, the one or more distortion types may include curvature in the horizon near the vertical edges of the frame. Alternatively, or in addition, the convolutional neural network architecture may be extendable to any number of classes (e.g., distortion types).

In another embodiment, the convolutional neural network may be trained to identify optical distortions associated with one or more video formats. Alternatively, or in addition, the convolutional neural network may be trained to identify optical distortions present in equirectangular and stereo equirectangular projections. Alternatively, or in addition, the convolutional neural network predictor may be trained using pre-labeled video frames. Alternatively, or in addition, the convolutional neural network may train on a multitude of batches containing sixty-four pre-labeled video frames. Alternatively, or in addition, the convolutional neural network may train using a learning rate value that decays over time. Alternatively, or in addition, the convolutional neural network may train using a 0.01 learning rate value that decays over time.

In yet another embodiment, the confidence value predictions may comprise one-hot encoded labels.

In another embodiment, the video pre-processing stage may select a subset of the total frames of video from the input video file. Alternatively, or in addition, the video pre-processing stage may generate additional video frames from the selected subset to incorporate a range of viewport variances (e.g., rotations, scale and translations) into the set of video frames sent to the convolutional neural network. Alternatively, or in addition, the video pre-processing stage may generate additional video frames from the selected subset to incorporate a range of intra-class variances into the set of video frames sent to the convolutional neural network. Alternatively, or in addition, the pre-processing stage may provide a uniform size and channel count to each frame provided to the convolutional neural network predictor.

In an embodiment, the system does not utilize computer vision heuristics, and is built around a deep convolutional neural network architecture. Further, the system may be built as a fully automatic pipeline for video format classification, thereby allowing easy human computer interaction (HCI) when uploading videos to a video sharing application.

In an embodiment, the system may be part of or utilized by a video sharing application, where the video sharing application uses the meta data generated by the system to display the input video file correctly, store the input file correctly, stream the input video file correctly, and so forth.

Some embodiments may provide a method for classifying the format of a video file that includes the steps of: (a) splitting an input video file into a set of frames; (b) generating, by a convolutional neural network, one or more confidence value predictions for each of the frames in the set respectively, e.g., with respect to one or more of a two-dimensional video format, a spherical video format and/or a stereo spherical video format; (c) determining the format of video, e.g., the video file based upon a mean confidence value calculated from the confidence value predictions; and (d) developing metadata associated with the video file corresponding to the determined format of the video. Moreover, embodiments may provide a method for classifying the format of a video file that includes the steps of: (a) splitting an input video file into a subset of frames; (b) generating, by a convolutional neural network, one or more confidence value predictions for each of the frames in the subset respectively with respect to one or more video formats; (c) determining the format of video for the video file based upon an overall confidence value calculated from the frame-based confidence values generated in step (b); and (d) taking action according to the determined format of the video, e.g., where the action can be meta-tagging the video file according to the determined format, storing the video file according to the determined format, playing the video file according to the determined format, transmitting the video file according to the determined format, and/or displaying the result of the determined format to a user.

In some embodiments, the method may include training the convolutional neural network to identify optical distortions associated with the one or more video formats. Alternatively, or in addition, the method may include training the convolutional neural network to identify optical distortions present in equirectangular and stereo equirectangular projections. Alternatively, or in addition the method may include the step of training the convolutional neural network using pre-labeled video frames. Alternatively, or in addition, the training step may train on a multitude of batches containing sixty-four pre-labeled video frames. Alternatively, or in addition, the training step may train using a learning rate value that decays over time. Alternatively, or in addition, the training step may train using a 0.01 learning rate value that decays over time.

In yet another embodiment, the method may include a video pre-processing step that selects a subset of the total frames of video from the input video file. Alternatively, or in addition, the video pre-processing step may generate additional video frames from the selected subset to incorporate a range of viewport variances into the set of video frames sent to the convolutional neural network. Alternatively, or in addition, the video pre-processing step may generate additional video frames from the selected subset to incorporate a range of intra-class variances into the set of video frames sent to the convolutional neural network. Alternatively, or in addition, the method may include a pre-processing step that provides a uniform size and channel count to each frame provided to the convolutional neural network.

In yet another embodiment, the method may include the step of uploading the video to a video sharing application, wherein the system is built as a fully automatic pipeline for video format classification, thereby allowing easy human computer interaction (HCI) during the uploading step.

Embodiments of the current disclosure have various advantages over the state of the art. For example, embodiments of the current disclosure may enable handling of 360 video files automatically without necessitating manual identification steps. Moreover, embodiments may reduce the amount of confusion around how to manually set the 360 setting for an uploaded video. Furthermore, embodiments may make it facilitate uploading 360 videos to a video sharing platform from mobile devices. Some embodiments can be extended to predict future types of video classes. Furthermore, embodiments may be extended to identify other types of distortions or related features in a video and automatically flag them.

The above summary may present a simplified overview of some embodiments of the invention in order to provide a basic understanding of certain aspects of the invention discussed herein. The summary is not intended to provide an extensive overview of the invention, nor is it intended to identify any key or critical elements, or delineate the scope of the invention. The sole purpose of the summary is merely to present some concepts in a simplified form as an introduction to the detailed description presented below.

BRIEF DESCRIPTION OF THE DRAWINGS

The accompanying drawings, which are incorporated in and constitute a part of this specification, illustrate various embodiments of the invention and, together with the general description of the invention given above, and the detailed description of the embodiments given below, serve to explain the embodiments of the invention.

DETAILED DESCRIPTION OF ILLUSTRATIVE EMBODIMENTS

Embodiments of the current disclosure are composed of a supervised convolutional neural network trained on pre-labeled image frames that are pre-labeled with one-hot encoded labels (for more information about one-hot encoding see *Entity Embeddings of Categorical Variables*). Embodiments of the system are then trained to classify and predict the confidence value for visual distortions present in equirectangular projection (further explanations about map projections are shown in *Understanding Map Projections*). Embodiments of the system need to generalize well enough to overcome some important challenges in image classification, predominantly:

In describing embodiments of the present disclosure illustrated in the figures, specific terminology is employed for the sake of clarity. The disclosure, however, is not intended to be limited to the specific terminology so selected, and it is to be understood that each specific element includes all technical equivalents that operate in a similar manner to accomplish a similar purpose.

Viewport invariant—Embodiments of the system are able to detect equirectangular visual distortions given a range of viewport rotations, scale, and translation. Furthermore, embodiments of the system build a robust understanding of the differences between different spherical distortions (fisheye, wide-lens, nadir-centered and zenith-centered stereographic projections) from a full 360 degree equirectangular and stereo equirectangular projections.

Intra-class Invariant—Embodiments of the system are able to detect 360 content from 2D content given the same objects in both images. Furthermore, this becomes an even harder challenge as the system fits the model to specific shape edges. Embodiments of the system apply different data augmentation and normalization methods to avoid the system learning a specific class of objects, and evaluate it based on a set of evaluation images of things it has never seen to estimate its performance metrics.

An exemplary process for building the exemplary system comprises:

Input: An input may consist of a set of 64-image batches (e.g., each training batch may contain 64 images, and hundreds of such batches may be used to train the system), each image may be pre-labeled with one of 3 different classes (e.g., spatial, spatial stereo and 2D). This data may be referred to as the training set.

Learning: The training set may be used to learn what every one of the classes looks like. In some embodiments, this step is referred to as training a classifier or learning a model.

Evaluation: In the end, embodiments may evaluate the quality of the classifier by asking it to predict labels for a new set of images that it has never seen before. The true labels of these images may then be compared to the ones predicted by the classifier. Thus, a lot of the predictions may match up with the true answers (e.g., the ground truth).

Network Architecture

Figure 1:
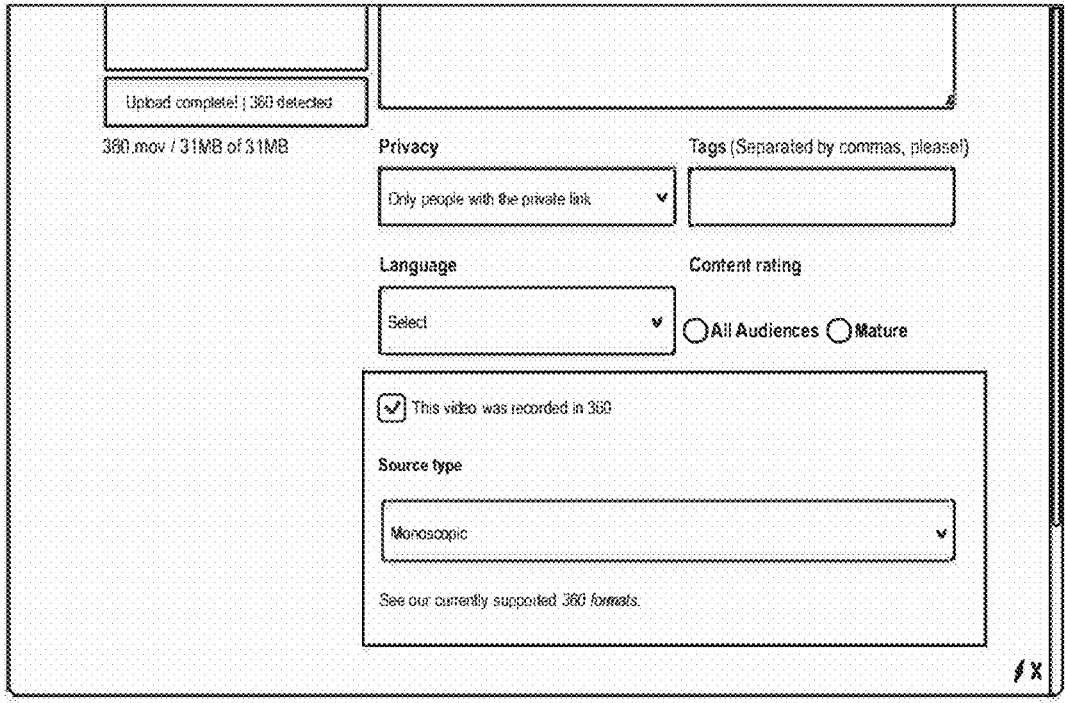
FIG. 1 is an example of a video sharing platform of the prior art.
Figure 2:
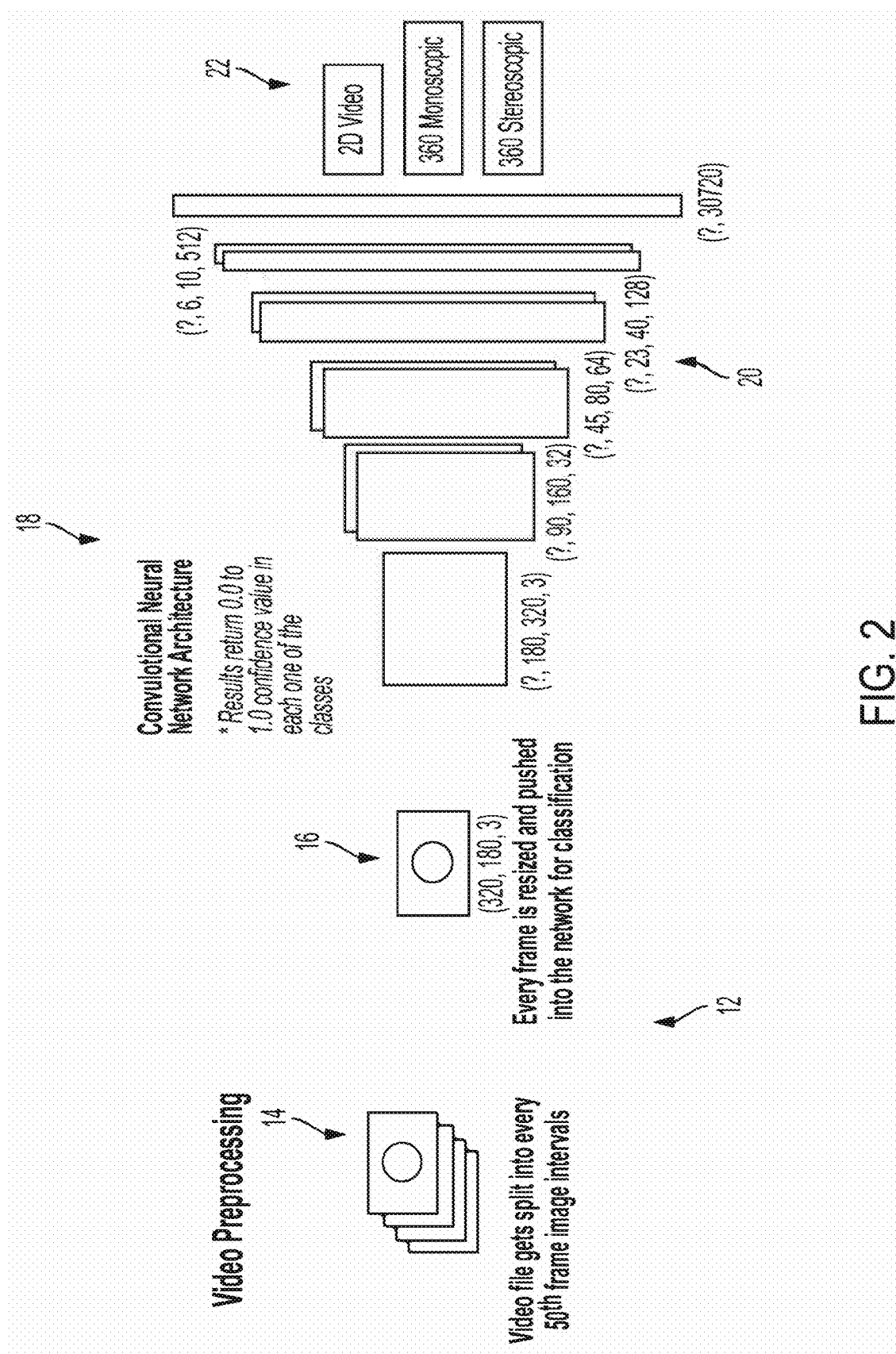
FIG. 2 is an example illustration of a supervised convolutional neural network-based system consisting of five convolution layers according to an embodiment of the present disclosure.

Embodiments propose a supervised convolutional neural network based system consisting of five convolution layers as shown in FIG. 2.

As shown in FIG. 2, a video preprocessing stage 12 may include splitting the input video file into a plurality of frames 14, e.g., splitting the video file into every $50^{th}$ frame image intervals. In an embodiment, the subset of selected frames is limited to 50,000 of such frames, where 80% of the subset are used for training and 20% are used for validation. Next the subset of video frames is resized, if necessary, and pushed to the neural network 18 for classification. As shown in FIG. 2, the neural network breaks down the video image into convolutional blocks 20, each block represents a smaller and smaller chunk of the frame so that the system can identify optical distortions representative of the video format 22. Below each block represents the batch-size, height, width and depth for each block. Question marks in the graph above represent the batch size for training procedure and are not when running inference.

In order to make the network both viewport invariant and intra-class invariant (as explained above) multiple architectures were tested, consisting of different convolution layers, loss functions, weight initializations and hyper-parameters. The exemplary embodiment shown in FIGS. 2 and 3A-3C represent the optimal structure for the problem embodiments are solving (but as also explained herein, it is to be understood that it is within the scope of various embodiments of the disclosure and claims to utilize alternative structures, which may lead to suitable results).

Figure 3A:
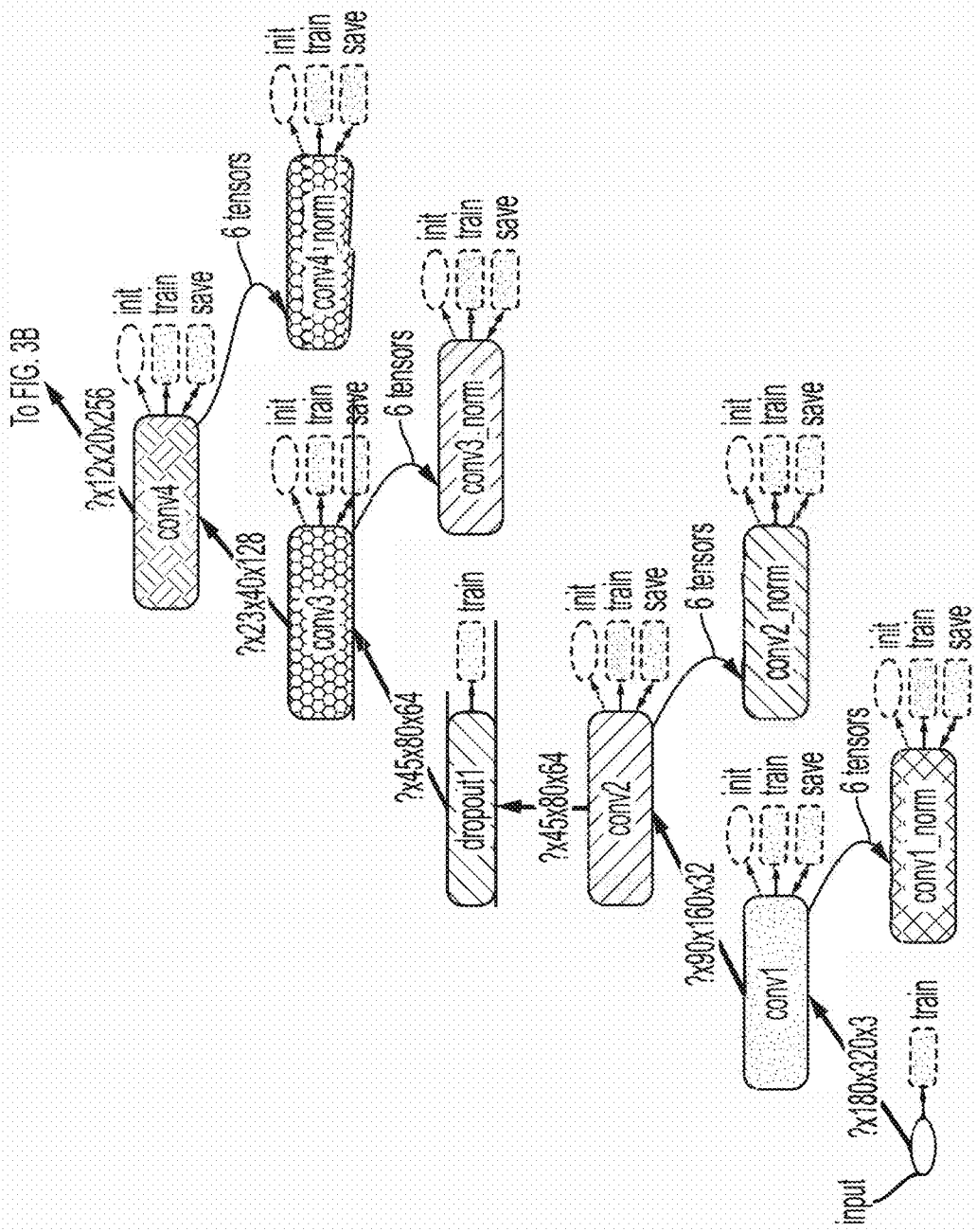
FIG. 3A is an example illustration of a network operations and layer architecture according to an embodiment of the present disclosure.
Figure 3B:
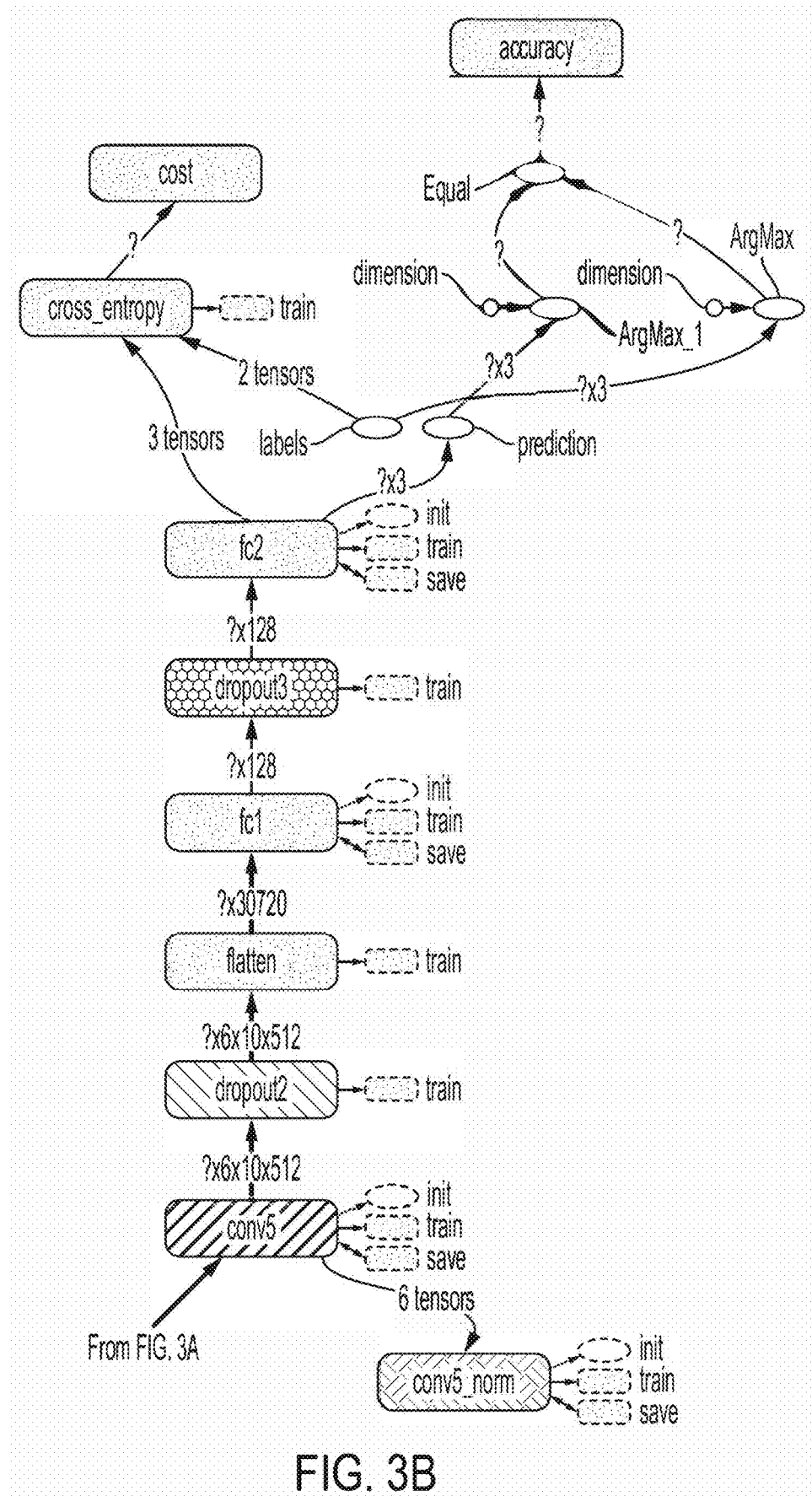
FIG. 3B is an example illustration of a network operations and layer architecture according to an embodiment of the present disclosure.
Figure 3C:
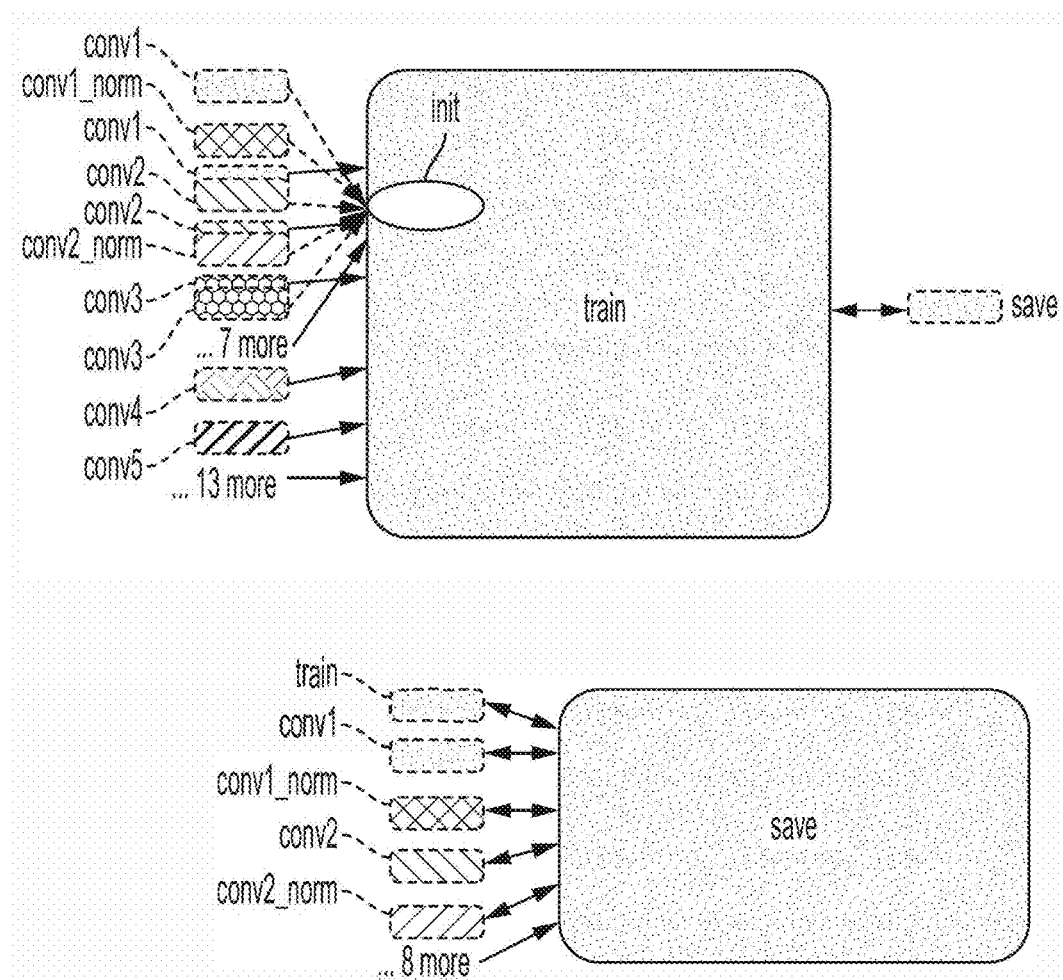
FIG. 3C is an example illustration of a network operations and layer architecture according to an embodiment of the present disclosure.

Network Layer and Operation Architecture:

FIGS. 3A-3C demonstrate a proposed network operations and layer architecture that has found to work best for solving visual distortion classification. As discussed herein, it is within the scope of the current disclosure that alternative architectures may provide suitable results based upon the specific application.

As shown, in FIGS. 3A-3C, five convolution layers may be used (e.g., labeled conv1, conv2, conv3, conv4 and conv5) with single stride, and no padding followed by pooling operations. Batch normalization operations may be applied (e.g., labeled conv1_norm, conv2_norm, conv3_norm, conv4_norm and conv5_norm) to scale and center the data flowing through the network, which may facilitate avoiding exploding gradients. 3 dropout layers (e.g., labeled dropout1, dropout2, and dropout3) may be used, which operate while training and help reduce network overfitting. Although embodiments may share some characteristics with the VGG16 proposed architecture as shown in Very Deep Convolutional Networks for Large-Scale Image Recognition, the VGG16 proposed architecture is more shallow and embodiments may use more data-normalization operations (such as batch normalization on each layer) and multiple dropout layers, and by optimizing the network architecture, embodiments may be able to achieve state-of-the-art results solving the visual distortion classification task.

In some examples, embodiments of the neural network architecture may be designed using TensorFlow software package.

Network Block-By-Block:

Embodiments of the network architecture may include the following blocks or layers:

1. 5 Convolutional blocks—The cony layer's parameters may include a set of learnable filters. Every filter may be small spatially (e.g., along width and height), but may extend through the full depth of the input volume. For example, a typical filter on a first layer of the system might have a size such as 5×5×3 (e.g., 5 pixels width and height, and 3 because images have depth 3, the color channels). During the forward pass, embodiments may slide or convolve each filter across the width and height of the input volume and compute dot products between the entries of the filter and the input at any position. As embodiments slide the filter over the width and height of the input volume they will produce a 2-dimensional activation map that gives the responses of that filter at every spatial position. Intuitively, the network will learn filters that activate when they see some type of visual feature such as an edge representing equirectangular distortions.

2. Batch normalization layers—To increase the stability of a neural network, embodiments may use batch normalization to normalize the output of a previous activation layer by subtracting the batch mean and dividing by the batch standard deviation. However, after this shift/scale of activation outputs by some randomly initialized parameters, the weights in the next layer may no longer be optimal. SGD (Stochastic gradient descent) may undo this normalization, e.g., if it is a way for it to minimize the loss function. Consequently, batch normalization may add two trainable parameters to each layer, so the normalized output is multiplied by a "standard deviation" parameter (gamma) and add a "mean" parameter (beta). Thus, batch normalization may let SGD do the denormalization by changing only these two weights for each activation, e.g., instead of losing the stability of the network by changing all the weights.

3. Dropout layers—Dropout is a regularization technique developed for reducing overfitting in neural networks by preventing complex co-adaptations on training data and is a very efficient way of performing model averaging with neural networks. The term "dropout" refers to dropping out units (e.g., both hidden and visible) in a neural network.

4. 3 Fully connected layers—Finally, after several convolutional and max pooling layers, the high-level reasoning in the neural network may be done via fully connected layers. Neurons in a fully connected layer have connections to all activations in the previous layer, as seen in regular (e.g., non-convolutional) artificial neural networks. Their activations can thus be computed as an affine transformation, with matrix multiplication followed by a bias offset (e.g., vector addition of a learned or fixed bias term).

Hyper Parameters:

In some embodiments, a development process may include an extensive grid search for the optimal network hyper-parameters.

Learning Rate: Embodiments may start the training procedure with a 0.01 learning rate value which embodiments decay over time to increase network optimization (as shown in The Marginal Value of Adaptive Gradient Methods in Machine Learning)

---
Learning Rate Decay
---

Where t is the current training step
learning_rate = learning_rate * sqrt (1 − beta2^t) / (1 − beta1^t)

Embodiments may use the Adaptive Moment Estimation (also referred to as the Adam optimizer) as described in *ADAM: A METHOD FOR STOCHASTIC OPTIMIZATION* which optimizes the Gradient Descent algorithm during training by changing learning rate.

Batch Size: Embodiments may use input batches of 64 images, which requires the network to learn from a diverse input batch at every step, making it harder to overfit a specific class of images (e.g., helps make it intra-class invariant).

Figure 4:
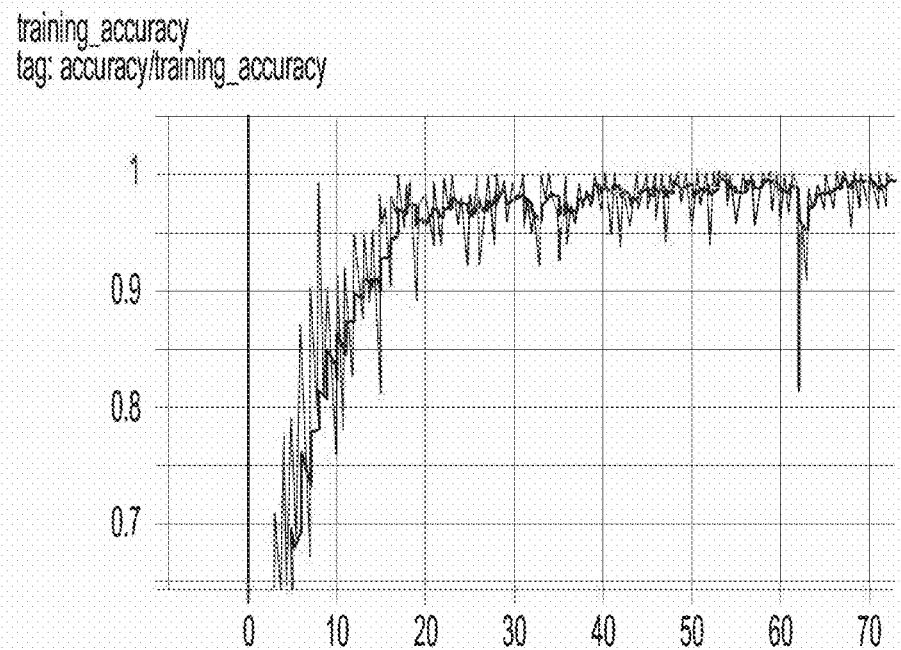
FIG. 4 is an example illustration of training accuracy and cost graphs associated with an embodiment of the present disclosure.
Figure 4:
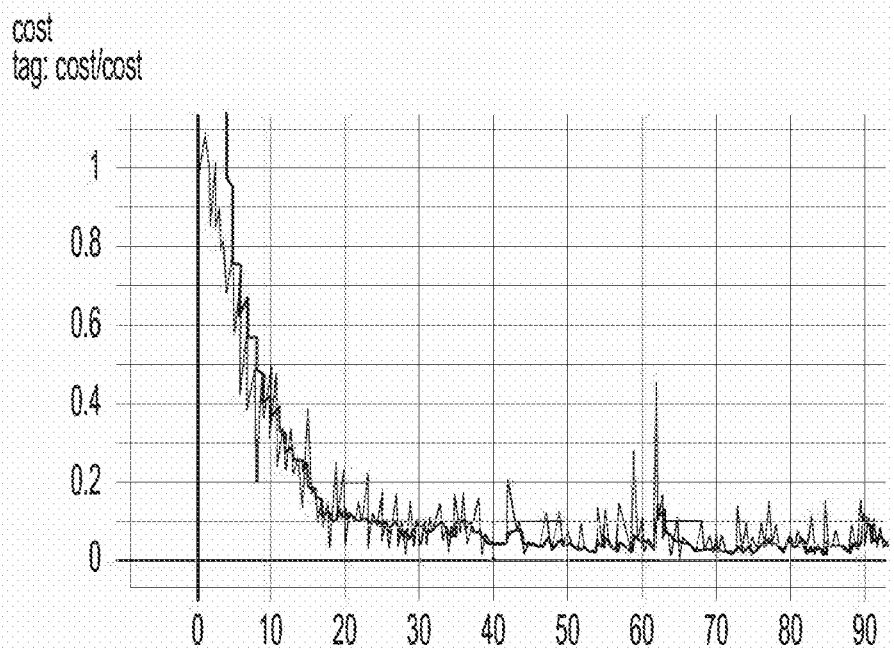

Training:

Embodiments may train for a 100 epochs on a 15,000 sample dataset (approx. 230 batches per epoch) and are able to reach the results provided in FIG. 4. For example, FIG. 4 provides training accuracy and cost graphs associated with the exemplary architecture.

Inference:

An exemplary system works by taking the following steps:

1. Split video—parse the incoming video and split it to 3 frames per scene by analyzing visual similarity and determining when cuts happen
2. Run inference—run the selected frames through the network and make predictions for each one of them
3. Sum and calculate the mean prediction—calculate the mean of all predictions and return this value to determine which class this video is To make sure the system is not predicting based on a single frame that does not represent the whole video, embodiments may add a video preprocessing stage, where the file is split into a series of frames (e.g., every ⅕₀th frame is used) and a summation of the mean prediction value of all the frames is used to determine which class has the strongest confidence value for a given video file.

Once the video has been predicted as either 2D, spherical monoscopic or spherical stereoscopic, embodiments inject the necessary metadata into it which would enable the right type of video display (e.g., 360 spherical or normal display for 2D video).

Figure 5:
FIG. 5 is an example of a video image classified as a 2D image according to an embodiment of the present disclosure.

FIG. 5 shows an example of a video image classified as 2D and the associated confidence values generated by the system for the three possible video image formats.

Figure 6:
FIG. 6 is an example of a video image classified as a 360 equirectangular image according to an embodiment of the present disclosure.

FIG. 6 shows an example of a video image classified as 360 equirectangular image and the associated confidence values generated by the system for the three possible video image formats.

Figure 7:
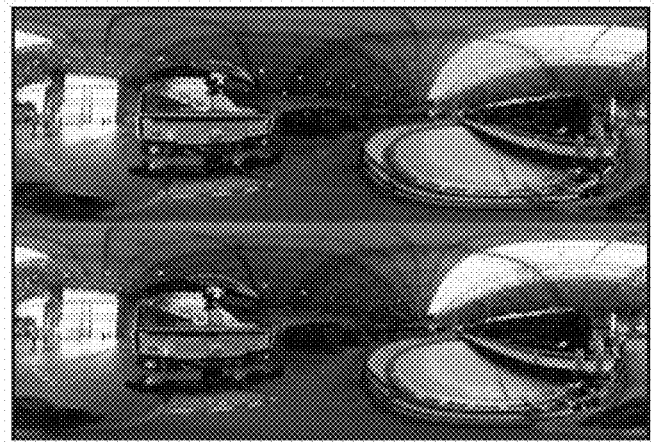
FIG. 7 is an example of a video image classified as a stereo 360 equirectangular image according to an embodiment of the present disclosure.

FIG. 7 shows an example of a video image classified as stereo 360 equirectangular image and the associated confidence values generated by the system for the three possible video image formats.

In an embodiment, if the overall confidence value calculated for the video is below 80%, then a video sharing application utilizing the exemplary system may be designed to query the user to select a video format (as is currently required in the state of the art).

Figure 8:
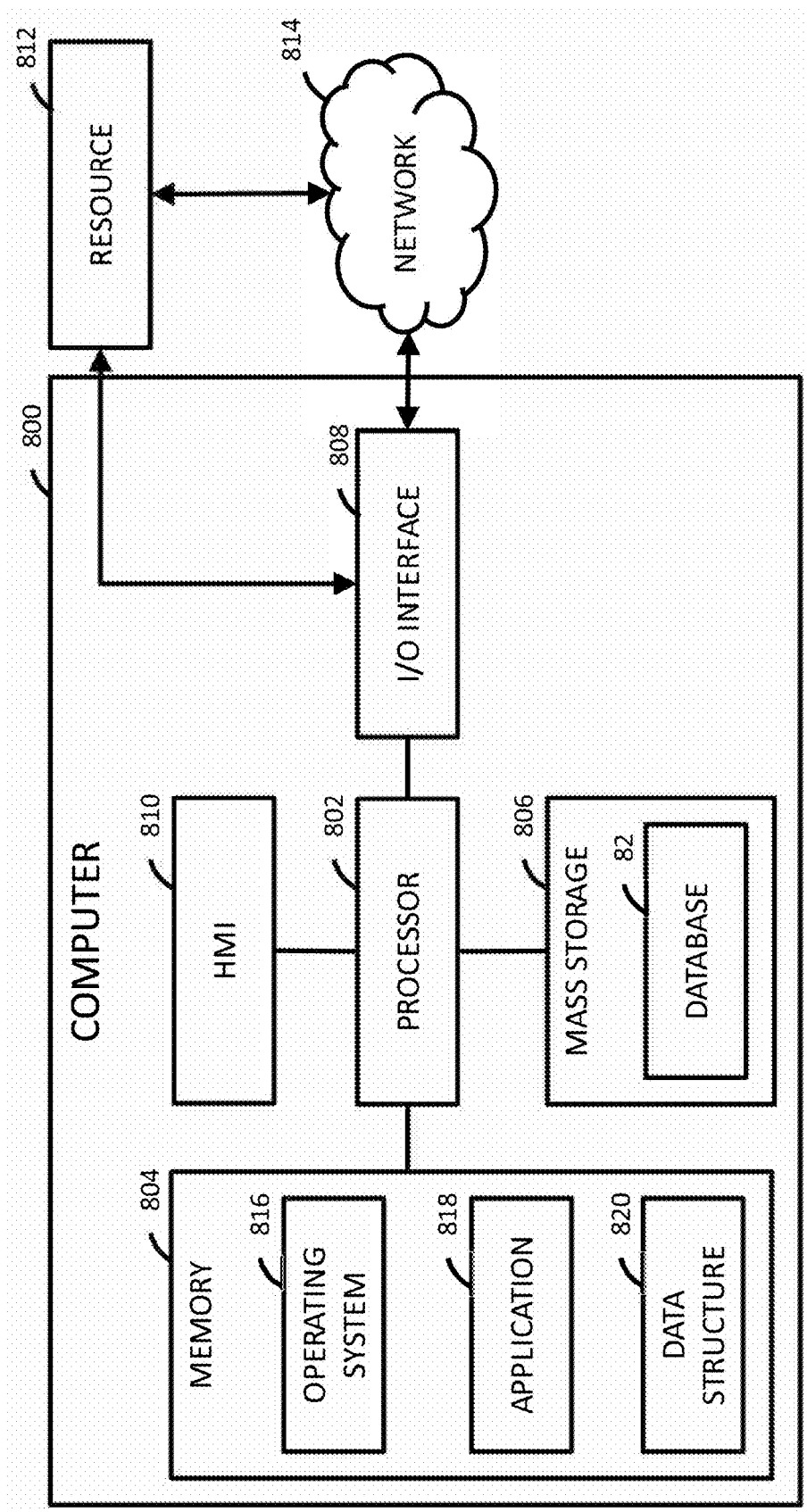
FIG. 8 is a schematic view of an exemplary computer system according to an embodiment of the present disclosure.

With reference to FIG. 8, a computer system of one or more embodiments may be implemented on one or more computer devices or systems, such as exemplary computer 800. The computer 800 may include a processor 802, a memory 804, a mass storage memory device 806, an input/output (I/O) interface 808, and a Human Machine Interface (HMI) 810. The computer 800 may also be operatively coupled to one or more external resources 812 via the communication network 814 or I/O interface 808. External resources 812 may include, but are not limited to, servers, databases, mass storage devices, peripheral devices, cloud-based network services, or any other suitable computer resource that may be used by the computer 800.

The processor 802 may include one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on operational instructions that are stored in the memory 804. The memory 804 may include a single memory device or a plurality of memory devices including, but not limited to, read-only memory (ROM), random access memory (RAM), volatile memory, non-volatile memory, static random access memory (SRAM), dynamic random access memory (DRAM), flash memory, cache memory, or any other device capable of storing information. The mass storage memory device 804 may include data storage devices such as a hard drive, optical drive, tape drive, non-volatile solid state device, or any other device capable of storing information.

The processor 802 may operate under the control of an operating system 816 that resides in the memory 804. The operating system 816 may manage computer resources so that computer program code embodied as one or more computer software applications, such as an application 818 residing in memory 804, may have instructions executed by the processor 802. In an alternative embodiment, the processor 802 may execute the application 818 directly, in which case the operating system 816 may be omitted. One or more data structures 820 may also reside in memory 804, and may be used by the processor 802, operating system 816, or application 818 to store or manipulate data.

The I/O interface 808 may provide a machine interface that operatively couples the processor 802 to other devices and systems, such as the communication network 814 or the one or more external resources 812. The application 818 may thereby work cooperatively with the communication network 814 or the external resources 812 by communicating via the I/O interface 808 to provide the various features, functions, applications, processes, or modules comprising embodiments of the invention. The application 818 may also have program code that is executed by the one or more external resources 812, or otherwise rely on functions or signals provided by other system or network components external to the computer 800. Indeed, given the nearly endless hardware and software configurations possible, persons having ordinary skill in the art will understand that embodiments of the invention may include applications that are located externally to the computer 800, distributed among multiple computers or other external resources 812, or provided by computing resources (hardware and software) that are provided as a service over the communication network 814, such as a cloud computing service.

The HMI 810 may be operatively coupled to the processor 802 of computer 800 in a known manner to allow a user to interact directly with the computer 800. The HMI 810 may include video or alphanumeric displays, a touch screen, a speaker, and any other suitable audio and visual indicators capable of providing data to the user. The HMI 810 may also include input devices and controls such as an alphanumeric keyboard, a pointing device, keypads, pushbuttons, control knobs, microphones, etc., capable of accepting commands or input from the user and transmitting the entered input to the processor 802.

A database 82 may reside on the mass storage memory device 806, and may be used to collect and organize data used by the various systems and modules described herein. The database 82 may include data and supporting data structures that store and organize the data. In particular, the database 82 may be arranged with any database organization or structure including, but not limited to, a relational database, a hierarchical database, a network database, or combinations thereof. A database management system in the form of a computer software application executing as instructions on the processor 802 may be used to access the information or data stored in records of the database 82 in response to a query, where a query may be dynamically determined and executed by the operating system 816, other applications 818, or one or more modules.

In general, the routines executed to implement the embodiments of the invention, whether implemented as part of an operating system or a specific application, component, program, object, module or sequence of instructions, or even a subset thereof, may be referred to herein as "computer program code," or simply "program code." Program code typically comprises computer readable instructions that are resident at various times in various memory and storage devices in a computer and that, when read and executed by one or more processors in a computer, cause that computer to perform the operations necessary to execute operations and/or elements embodying the various aspects of the embodiments of the invention. Computer readable program instructions for carrying out operations of the embodiments of the invention may be, for example, assembly language or either source code or object code written in any combination of one or more programming languages.

The program code embodied in any of the applications/modules described herein is capable of being individually or collectively distributed as a program product in a variety of different forms. In particular, the program code may be distributed using a computer readable storage medium having computer readable program instructions thereon for causing a processor to carry out aspects of the embodiments of the invention.

Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include random access memory (RAM), read-only memory (ROM), erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. A computer readable storage medium should not be construed as transitory signals per se (e.g., radio waves or other propagating electromagnetic waves, electromagnetic waves propagating through a transmission media such as a waveguide, or electrical signals transmitted through a wire). Computer readable program instructions may be downloaded to a computer, another type of programmable data processing apparatus, or another device from a computer readable storage medium or to an external computer or external storage device via a communication network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions/acts specified in the flowcharts, sequence diagrams, and/or block diagrams. The computer program instructions may be provided to one or more processors of a general purpose computer, special purpose computer, or other programmable data processing apparatus to produce a machine, such that the instructions, which execute via the one or more processors, cause a series of computations to be performed to implement the functions and/or acts specified in the flowcharts, sequence diagrams, and/or block diagrams.

In certain alternative embodiments, the functions and/or acts specified in the flowcharts, sequence diagrams, and/or block diagrams may be re-ordered, processed serially, and/or processed concurrently without departing from the scope of the invention. Moreover, any of the flowcharts, sequence diagrams, and/or block diagrams may include more or fewer blocks than those illustrated consistent with embodiments of the invention.

The terminology used herein is for the purpose of describing particular embodiments only and is not intended to be limiting of the embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "includes", "having", "has", "with", "comprised of", or variants thereof are used in either the detailed description or the claims, such terms are intended to be inclusive in a manner similar to the term "comprising".

While all of the invention has been illustrated by a description of various embodiments and while these embodiments have been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the Applicant's general inventive concept.

What is claimed is:

1. A fully-automatic system for classifying the spatial format of a video file, comprising:
    a video pre-processing stage, splitting and resizing an input video file into a set of frames;
    a convolutional neural network, receiving the set of frames and predicting one or more confidence values for each of the frames respectively, wherein the confidence values are one-hot encoded confidence values signifying either 2D, spherical (equirectangular) or stereo spherical (top-bottom equirectangular) projections detected per frame; and
    a discriminator stage, receiving the confidence values from the convolutional neural network and determining the spatial format of video based upon a mean confidence value calculated from the sum of per-frame confidence values; and
    a tagging stage adds the correct metadata associated with the video file corresponding to the format of the video determined at the discriminator stage,
    wherein the convolutional neural network is trained to identify optical distortions associated with the one or more video formats.

2. The system of claim 1, wherein the convolutional neural network architecture utilizes less than five convolution layers and at least one dropout layer.

3. The system of claim 1, wherein the convolutional neural network architecture utilizes a plurality of convolution layers and at least three dropout layers.

4. The system of claim 1, wherein the convolutional neural network architecture utilizes five convolution layers and three dropout layers.

5. The system of claim 1, wherein the convolutional neural network architecture utilizes batch normalization on each layer.

6. A fully automatic system for classifying the spatial format of a video file, comprising:
    a video pre-processing stage, splitting and resizing an input video file into a set of frames;
    a convolutional neural network, receiving the set of frames and predicting one or more confidence values for each of the frames respectively, wherein the confidence values are one-hot encoded confidence values signifying either 2D, spherical (equirectangular) or stereo spherical (top-bottom equirectangular) projections detected per frame; and
    a discriminator stage, receiving the confidence values from the convolutional neural network and determining the spatial format of video based upon a mean confidence value calculated from the sum of per-frame confidence values; and
    a tagging stage adds the correct metadata associated with the video file corresponding to the format of the video determined at the discriminator stage;
    wherein the convolutional neural network is trained to identify optical distortions present in equirectangular and stereo equirectangular projections.

7. The system of claim 1, wherein the confidence value predictions comprise one-hot encoded labels.

8. The system of claim 1, wherein the video pre-processing stage selects a subset of the total frames of video from the input video file.

9. A fully automatic system for classifying the spatial format of a video file, comprising:
    a video pre-processing stage, splitting and resizing an input video file into a set of frames;
    a convolutional neural network, receiving the set of frames and predicting one or more confidence values for each of the frames respectively, wherein the confidence values are one-hot encoded confidence values signifying either 2D, spherical (equirectangular) or stereo spherical (top-bottom equirectangular) projections detected per frame; and
    a discriminator stage, receiving the confidence values from the convolutional neural network and determining the spatial format of video based upon a mean confidence value calculated from the sum of per-frame confidence values; and
    a tagging stage adds the correct metadata associated with the video file corresponding to the format of the video determined at the discriminator stage;
    wherein the video pre-processing stage selects a subset of the total frames of video from the input video file; and
    wherein the video pre-processing stage for training the network generates additional video frames from the selected subset to incorporate a range of viewport variances into the set of video frames sent to the convolutional neural network.

10. A fully automatic system for classifying the spatial format of a video file, comprising:
    a video pre-processing stage, splitting and resizing an input video file into a set of frames;

a convolutional neural network, receiving the set of frames and predicting one or more confidence values for each of the frames respectively, wherein the confidence values are one-hot encoded confidence values signifying either 2D, spherical (equirectangular) or stereo spherical (top-bottom equirectangular) projections detected per frame; and a discriminator stage, receiving the confidence values from the convolutional neural network and determining the spatial format of video based upon a mean confidence value calculated from the sum of per-frame confidence values; and a tagging stage adds the correct metadata associated with the video file corresponding to the format of the video determined at the discriminator stage;

wherein the video pre-processing stage selects a subset of the total frames of video from the input video file; and wherein the video pre-processing stage for training the network generates additional video frames from the selected subset to incorporate a range of intra-class variances into the set of video frames sent to the convolutional neural network.

11. The system of claim 8, wherein the convolutional neural network predictor is trained using pre-labeled video frames.

12. The system of claim 11 wherein the convolutional neural network trains on a multitude of batches containing sixty-four pre-labeled video frames.

13. The system of claim 11, wherein the convolutional neural network trains using a learning rate value that decays over time.

14. A fully automatic system for classifying the spatial format of a video file, comprising:

a video pre-processing stage, splitting and resizing an input video file into a set of frames;

a convolutional neural network, receiving the set of frames and predicting one or more confidence values for each of the frames respectively, wherein the confidence values are one-hot encoded confidence values signifying either 2D, spherical (equirectangular) or stereo spherical (top-bottom equirectangular) projections detected per frame; and a discriminator stage, receiving the confidence values from the convolutional neural network and determining the spatial format of video based upon a mean confidence value calculated from the sum of per-frame confidence values; and a tagging stage adds the correct metadata associated with the video file corresponding to the format of the video determined at the discriminator stage;

wherein the video pre-processing stage selects a subset of the total frames of video from the input video file;

wherein the convolutional neural network predictor is trained using pre-labeled video frames;

wherein the convolutional neural network trains using a learning rate value that decays over time; and wherein the convolutional neural network trains using a 0.01 learning rate value that decays over time.

15. A fully automatic system for classifying the spatial format of a video file, comprising:

a video pre-processing stage, splitting and resizing an input video file into a set of frames;

a convolutional neural network, receiving the set of frames and predicting one or more confidence values for each of the frames respectively, wherein the confidence values are one-hot encoded confidence values signifying either 2D, spherical (equirectangular) or stereo spherical (top-bottom equirectangular) projections detected per frame; and a discriminator stage, receiving the confidence values from the convolutional neural network and determining the spatial format of video based upon a mean confidence value calculated from the sum of per-frame confidence values; and a tagging stage adds the correct metadata associated with the video file corresponding to the format of the video determined at the discriminator stage;

wherein the pre-processing stage provides a uniform size and channel count to each frame provided to the convolutional neural network predictor.

16. A fully automatic system for classifying the spatial format of a video file, comprising:

a video pre-processing stage, splitting and resizing an input video file into a set of frames;

a convolutional neural network, receiving the set of frames and predicting one or more confidence values for each of the frames respectively, wherein the confidence values are one-hot encoded confidence values signifying either 2D, spherical (equirectangular) or stereo spherical (top-bottom equirectangular) projections detected per frame; and a discriminator stage, receiving the confidence values from the convolutional neural network and determining the spatial format of video based upon a mean confidence value calculated from the sum of per-frame confidence values; and a tagging stage adds the correct metadata associated with the video file corresponding to the format of the video determined at the discriminator stage;

wherein the system does not utilize computer vision heuristics, and is built around a deep convolutional neural network architecture.

17. A fully automatic system for classifying the spatial format of a video file, comprising:

a video pre-processing stage, splitting and resizing an input video file into a set of frames;

a convolutional neural network, receiving the set of frames and predicting one or more confidence values for each of the frames respectively, wherein the confidence values are one-hot encoded confidence values signifying either 2D, spherical (equirectangular) or stereo spherical (top-bottom equirectangular) projections detected per frame; and a discriminator stage, receiving the confidence values from the convolutional neural network and determining the spatial format of video based upon a mean confidence value calculated from the sum of per-frame confidence values; and a tagging stage adds the correct metadata associated with the video file corresponding to the format of the video determined at the discriminator stage;

wherein the convolutional neural network architecture utilizes convolution layers to break down the frames into smaller filters that contain patterns associated with one or more distortion types.

18. The system of claim 17, wherein the one or more distortion types include curvature in the horizon near the vertical edges of the frame.

19. The system of claim 1, wherein the convolutional neural network architecture is extendable to any number of classes (distortion types).

20. The system of claim 1, wherein the system is built as a fully automatic pipeline for video format classification, thereby allowing easy human computer interaction (HCI) when uploading videos to a video sharing application.

21. A method for classifying the format of a video file, comprising the steps of:
splitting an input video file into a set of frames;
generating, by a convolutional neural network, one or more confidence value predictions for each of the frames in the set respectively with respect to one or more of a two-dimensional video format, a spherical video format and/or a stereo spherical video format; and
determining the format of the video file based upon a mean confidence value calculated from the confidence value predictions;
developing metadata associated with the video file corresponding to the determined format of the video; and
training the convolutional neural network to identify optical distortions associated with the one or more video formats.

22. The method of claim 21, wherein the convolutional neural network utilizes less than five convolution layers and at least one dropout layer.

23. The method of claim 21, wherein the convolutional neural network utilizes a plurality of convolution layers and at least three dropout layers.

24. The method of claim 21, wherein the convolutional neural network utilizes five convolution layers and three dropout layers.

25. The method of claim 21, wherein the convolutional neural network utilizes batch normalization on each layer in the generating step.

26. A method for classifying the format of a video file, comprising the steps of:
splitting an input video file into a set of frames;
generating, by a convolutional neural network, one or more confidence value predictions for each of the frames in the set respectively with respect to one or more of a two-dimensional video format, a spherical video format and/or a stereo spherical video format and
determining the format of the video file based upon a mean confidence value calculated from the confidence value predictions;
developing metadata associated with the video file corresponding to the determined format of the video; and
training the convolutional neural network to identify optical distortions present in equirectangular and stereo equirectangular projections.

27. The method of claim 21, wherein the confidence value predictions comprise one-hot encoded labels.

28. The method of claim 21, further comprising a video pre-processing step that selects a subset of the total frames of video from the input video file.

29. A method for classifying the format of a video file, comprising the steps of:
splitting an input video file into a set of frames;
generating, by a convolutional neural network, one or more confidence value predictions for each of the frames in the set respectively with respect to one or more of a two-dimensional video format, a spherical video format and/or a stereo spherical video format and
determining the format of the video file based upon a mean confidence value calculated from the confidence value predictions;
developing metadata associated with the video file corresponding to the determined format of the video; and
a video pre-processing step that selects a subset of the total frames of video from the input video file;
wherein the video pre-processing step generates additional video frames from the selected subset to incorporate a range of viewport variances into the set of video frames sent to the convolutional neural network.

30. A method for classifying the format of a video file, comprising the steps of:
splitting an input video file into a set of frames;
generating, by a convolutional neural network, one or more confidence value predictions for each of the frames in the set respectively with respect to one or more of a two-dimensional video format, a spherical video format and/or a stereo spherical video format and
determining the format of the video file based upon a mean confidence value calculated from the confidence value predictions;
developing metadata associated with the video file corresponding to the determined format of the video; and
a video pre-processing step that selects a subset of the total frames of video from the input video file;
wherein the video pre-processing step generates additional video frames from the selected subset to incorporate a range of intra-class variances into the set of video frames sent to the convolutional neural network.

31. The method of claim 28, further comprising the step of training the convolutional neural network using pre-labeled video frames.

32. The method of claim 31, wherein the training step trains on a multitude of batches containing sixty-four pre-labeled video frames.

33. The method of claim 31, wherein the training step trains using a learning rate value that decays over time.

34. A method for classifying the format of a video file, comprising the steps of:
splitting an input video file into a set of frames;
generating, by a convolutional neural network, one or more confidence value predictions for each of the frames in the set respectively with respect to one or more of a two-dimensional video format, a spherical video format and/or a stereo spherical video format and
determining the format of the video file based upon a mean confidence value calculated from the confidence value predictions;
developing metadata associated with the video file corresponding to the determined format of the video;
a video pre-processing step that selects a subset of the total frames of video from the input video file; and
training the convolutional neural network using pre-labeled video frames;
wherein the training step trains using a learning rate value that decays over time; and
wherein the training step trains using a 0.01 learning rate value that decays over time.

35. A method for classifying the format of a video file, comprising the steps of:
splitting an input video file into a set of frames;
generating, by a convolutional neural network, one or more confidence value predictions for each of the frames in the set respectively with respect to one or more of a two-dimensional video format, a spherical video format and/or a stereo spherical video format and
determining the format of the video file based upon a mean confidence value calculated from the confidence value predictions;
developing metadata associated with the video file corresponding to the determined format of the video; and a pre-processing step that provides a uniform size and channel count to each frame provided to the convolutional neural network.

36. A method for classifying the format of a video file, comprising the steps of:
splitting an input video file into a set of frames;
generating, by a convolutional neural network, one or more confidence value predictions for each of the frames in the set respectively with respect to one or more of a two-dimensional video format, a spherical video format and/or a stereo spherical video format and
determining the format of the video file based upon a mean confidence value calculated from the confidence value predictions; and
developing metadata associated with the video file corresponding to the determined format of the video;
wherein the method does not utilize computer vision heuristics, and is built around a deep convolutional neural network architecture.

37. A method for classifying the format of a video file, comprising the steps of:
splitting an input video file into a set of frames;
generating, by a convolutional neural network, one or more confidence value predictions for each of the frames in the set respectively with respect to one or more of a two-dimensional video format, a spherical video format and/or a stereo spherical video format and
determining the format of the video file based upon a mean confidence value calculated from the confidence value predictions; and
developing metadata associated with the video file corresponding to the determined format of the video;
wherein the convolutional neural network architecture utilizes convolution layers to break down the frames into smaller filters that contain patterns associated with one or more distortion types.

38. The method of claim 37, wherein the one or more distortion types include curvature in the horizon near the vertical edges of the frame.

39. The method of claim 21, wherein the convolutional neural network architecture is extendable to any number of classes (distortion types).

40. The method of claim 21, further comprising the step of uploading the video to a video sharing application, wherein the system is built as a fully automatic pipeline for video format classification, thereby allowing easy human computer interaction (HCI) during the uploading step.

41. A system for classifying the spatial format of a video file:
a video pre-processing stage, splitting an input video file into a set of frames;
a convolutional neural network, receiving the set of frames and predicting one or more confidence values for each of the frames respectively, wherein the confidence values signify one or more spatial video formats detected per frame; and
a discriminator stage, receiving the per-frame confidence values from the convolutional neural network and determining the spatial format of video based upon an overall confidence value calculated from the plurality of per-frame confidence values; and
an action stage that takes appropriate action with respect to the video file based upon the determined spatial format of the video, the appropriate action including meta-tagging the video file according to the determined spatial format, storing the video file according to the determined spatial format, playing the video file according to the determined spatial format, transmitting the video file according to the determined spatial format, and/or displaying the result of the determined spatial format to a user.

* * * * *